United States Patent [19]

Akamatsu

[11] Patent Number: 5,047,703
[45] Date of Patent: Sep. 10, 1991

[54] MOTOR DRIVING DEVICE

[76] Inventor: Koji Akamatsu, c/o Nagoya Seisakusho of Mitsubishi Denki Kabushiki Kaisha, 1-14, Yada Minami 5-chome, Higashi-ku,, Nagoya City, Aichi Prefecture, Japan

[21] Appl. No.: 426,560
[22] Filed: Oct. 25, 1989

[30] Foreign Application Priority Data

Oct. 28, 1988 [JP] Japan .................. 63-272147

[51] Int. Cl.$^5$ ........................................... G05B 11/01
[52] U.S. Cl. .......................... 318/630; 318/48
[58] Field of Search ........................ 318/4–11, 318/15, 34, 40, 48, 159, 432, 436, 630

[56] References Cited

U.S. PATENT DOCUMENTS

| | | | |
|---|---|---|---|
| 3,434,025 | 3/1969 | Parkinson et al. | 318/48 X |
| 3,559,008 | 1/1971 | Stut et al. | 318/8 |
| 4,087,731 | 5/1978 | Rhoades | 318/8 X |
| 4,513,229 | 4/1985 | Kudelski | 318/6 X |
| 4,620,241 | 10/1986 | Ono | 318/7 X |
| 4,638,221 | 1/1987 | Brignall | 318/48 |

*Primary Examiner*—Bentsu Ro

[57] ABSTRACT

The present invention relates to a motor driving device wherein two motors are held in engagement with an identical spindle through respective torque transmission mechanisms, and wherein each of the motors has a driving amplifier for generating a torque in a direction reverse to that of a torque of the other motor; comprising an integration circuit which integrates with respect to time a difference signal between an angle command value of the spindle and a rotational angle feedback value thereof, and which applies its integral output to the driving amplifiers in common.

1 Claim, 6 Drawing Sheets ated, the velocity amplifier AMP$_1$ 2 applies a minus voltage $-V_3$ to the motor M$_1$ 4, which generates the torque in the direction of the solid-line arrow in FIG. 5, while the velocity amplifier AMP$_2$ 3 applies a plus voltage $V_3$ to the motor M$_2$ 5, which generates the torque in the direction of the broken-line arrow in FIG. 5. Thus, the motors M$_1$ 4 and M$_2$ 5 become stationary in the form of pulling each other. That is, the mechanical backlash between the reduction gear G$_1$ 10 and the spindle 9 and the mechanical backlash between the reduction gear G$_2$ 11 and the spindle 9 are canceled from each other. On this occasion, it is common practice that currents that flow through the motors M$_1$ 4 and M$_2$ 5 are set at about 1/10 of the rated current value of the motors, and the circuit constants of the velocity amplifiers AMP$_1$ 2 and AMP$_2$ 3 are set at values for achieving the set current value.

MOTOR DRIVING DEVICE

BACKGROUND OF THE INVENTION

The present invention relates to an angle controlling servo driver having a construction wherein mechanical backlashes are eliminated by the use of two motors. More particularly, it relates to a technique which adds an integration circuit within a velocity control loop in order to enhance a static positioning accuracy.

FIG. 4 shows a prior-art example of a positioning servo system having a construction wherein, using two motors, mechanical backlashes in the transmission mechanisms between the motors and a spindle are canceled.

Referring to the figure, the servo system includes an error counter 1 which counts the difference between command pulses and position feedback pulses, velocity amplifiers 2 (AMP$_1$) and 3 (AMP$_2$), servomotors 4 (M$_1$) and 5 (M$_2$), velocity detectors or tachometer generators 6 (TG$_1$) and 7 (TG$_2$), and a position detector or encoder 8 (EN). The position feedback pulses delivered from the position detector EN 8 are fed back to the minus input terminal of the error counter 1, and velocity feedback signals delivered from the velocity detectors TG$_1$ 6 and TG$_2$ 7 are respectively fed back to the minus input terminals of the velocity amplifiers AMP$_1$ 2 and AMP$_2$ 3.

FIG. 5 shows the mechanism portion of the servo system in FIG. 4. In FIG. 5 et seq., the same symbols as in FIG. 4 indicate identical constituents. Numeral 9 designates a spindle, which is coaxially coupled with the position detector EN 8. The servomotor M$_1$ 4 and the velocity detector TG$_1$ 6 are coaxially coupled, and they are coupled to the spindle 9 through a reduction gear 10 (G$_1$). Likewise, the servomotor M$_2$ 5 and the velocity detector TG$_2$ 7 are coaxially coupled, and they are coupled to the spindle 9 through a reduction gear 11 (G$_2$).

FIG. 6 shows the input/output characteristics of the velocity amplifiers AMP$_1$ 2 and AMP$_2$ 3. As illustrated in the figure, the velocity amplifier AMP$_1$ 2 produces a proportional minus voltage ($-V_1$) in response to a plus velocity input ($v_1$) and produces the null voltage in response to a minus input except the vicinity of the null velocity input. On the other hand, the velocity amplifier AMP$_2$ 3 produces a proportional plus voltage ($V_2$) in response to a minus velocity input ($-v_2$) and produces the null voltage in response to a plus input except in the vicinity of the null velocity input. The velocity amplifier AMP$_1$ 2 applies the voltage $-V_1$ to the motor M$_1$ 4 in response to the plus velocity input $v_1$, whereupon as shown in FIG. 5, the motor M$_1$ 4 generates a torque indicated by an arrow in a solid line and rotates the spindle 9 in the direction of an arrow in a solid line (in the clockwise direction). On that occasion, the velocity amplifier AMP$_2$ 3 applies the null voltage to the motor M$_2$ 5, which does not generate a torque for rotating the spindle 9. Likewise, the velocity amplifier AMP$_2$ 3 applies the voltage $V_2$ to the motor M$_2$ 5 in response to the minus velocity input $-v_2$, whereupon as shown in FIG. 5, the motor M$_2$ 5 generates a torque indicated by an arrow in a broken line and rotates the spindle 9 in the direction of an arrow in a broken line (in the counterclockwise direction). On that occasion, the velocity amplifier AMP$_1$ 2 applies the null voltage to the motor M$_1$ 4, which does not generate a torque for rotating the spindle 9. Next, in a case where the velocity input v is FIG. 7 exemplifies the circuits of the velocity amplifiers AMP$_1$ 2 and AMP$_2$ 3. Since both the velocity amplifiers AMP have equivalent circuit arrangements, the velocity amplifier AMP$_1$ 2 shall now be detailed. After the detection signal (the velocity feedback signal) from the velocity detector TG$_1$ 6 is amplified by an operational amplifier 21, the amplified output of this amplifier is applied to an operational amplifier 22 together with a velocity input signal X$_1$, and the deviation of the amplified output from the velocity input signal X$_1$ is delivered as an output X$_2$. This deviation output X$_2$ serves as the velocity input v as explained with reference to FIG. 6, and it is applied to an operational amplifier 23. When the velocity input v exceeds a predetermined value, the output voltage V of the operational amplifier 23 proportional to the increase of the velocity input v is applied to and amplified by an operational amplifier 24 at the succeeding stage. The amplified voltage is applied to the motor M$_1$ 4.

In the velocity amplifier AMP$_2$ 3, the input/output characteristic of an operational amplifier 33 are opposite in polarity to that of the operational amplifier 23, and an output in the opposite polarity is applied to the motor M$_2$ 5 through an operational amplifier 34.

In the position (angle) controlling servo system mentioned as the prior-art example, it is an important basic performance to make null a servo rigidity in a low-velocity region, especially the magnitude of the error of a stopping position relative to a command value in the stationary state, namely, a steady-state position error. In order to achieve this content, therefore, the following has been considered:

(1) The forward gains of the velocity amplifiers AMP$_1$ 2 and AMP$_2$ 3 are increased.

(2) The gains in the low-velocity region are increased using nonlinear circuit elements.

(3) Integral elements are added within the velocity control loops.

The measures (1) and (2), however, render the servo system unstable and are difficult of performing a stable position control. Particularly with the measure (2), position loop gains fail to become constant versus the velocity. Meanwhile, the measure (3) is a method commonly practised. However, when the velocity amplifiers AMP$_1$ 2 and AMP$_2$ 3 are respectively provided with the integral elements, as in the case of the construction as in the prior-art example, the motors M$_1$ 4 and M$_2$ 5 become stationary in the form of pulling each other in the state in which armature currents in excess of the rated current value of the motors are flowing, for a reason to be described later. Then, since the excess currents continue to flow through the motors, damages might be inflicted on the motors.

This reason will now be elucidated. In the case where the velocity amplifiers AMP$_1$ 2 and AMP$_2$ 3 are respectively provided with integral elements 14 and 15 as shown in FIG. 8, both the outputs of the velocity detectors TG$_1$ 6 and TG$_2$ 7 are 0 volt in the stationary states of the motors. A plus or minus minute voltage is applied as the voltage X$_1$ of the velocity input portion, depending upon the magnitude of the steady-state position error. Charges are stored in the capacitors of the integral elements 14 and 15 by the minute voltage, whereby sufficiently great voltages integrated with respect to time are delivered as the output voltages X$_2$ and X$_3$ of the respective integral elements 14 and 15. On this occasion, however, whether or not the voltages X$_2$ and X$_3$ become an identical polarity is indefinite on account of the characteristics of operational amplifiers 22a and 32a (especially, input offset voltages in the operational amplifiers), etc. In a case where the voltage X$_2$ is minus and where the voltage X$_3$ is plus, the output torques of the motors M$_1$ 4 and M$_2$ 5 are respectively in the directions indicated by the arrows of the solid line and the broken line in FIG. 5, and the motors M$_1$ 4 and M$_2$ 5 become stationary in the form of pulling each other in the state in which the armature currents in excess of the rated current value of the motors are flowing. The excess currents sometimes continue to flow through the motors, so that the motors might be damaged.

SUMMARY OF THE INVENTION

The present invention has been made in order to eliminate the problem as mentioned above, and has for its object to provide a motor driving device in which, in the mode of bringing two motors to a standstill, the motors do not become stationary in the form of pulling each other while armature currents in excess of the rated current value of the motors are flowing, so that the excess currents are prevented from flowing through the motors.

A motor driving device according to the present invention consists, in a motor driving device wherein two motors are held in engagement with an identical spindle through respective torque transmission mechanisms and wherein each of the motors has a driving amplifier for generating a torque in a direction reverse to that of a torque of the other motor, comprising an integration circuit which integrates with respect to time a difference signal between an angle command value of the spindle and a rotational angle feedback value thereof and which applies its integral output to the driving amplifiers in common.

According to the present invention, both the driving amplifiers are supplied with the single output of the integration circuit in common. Therefore, even in a case where steady-state inputs responsive to the angle command value of the spindle as produced by the motors in the mode of stopping them are applied to the integration circuit and are integrated with respect to time into the voltage output and where this voltage output is applied to the respective driving amplifiers, both these driving amplifiers receive the inputs as offset voltages of identical polarity and identical magnitude. Accordingly, the motors are prevented from rotating in reverse directions and becoming stationary in the form of pulling each other.

BRIEF DESCRIPTION OF THE DRAWINGS

Throughout the drawings, the same symbols indicate identical or equivalent portions.

DESCRIPTION OF THE PREFERRED EMBODIMENT

Figure 2:
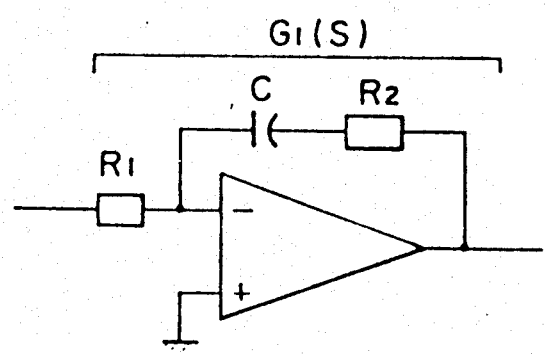
FIGS. 2 and 3 are diagrams for explaining an integration circuit which is applied to the velocity amplifiers in this embodiment.
Figure 8:
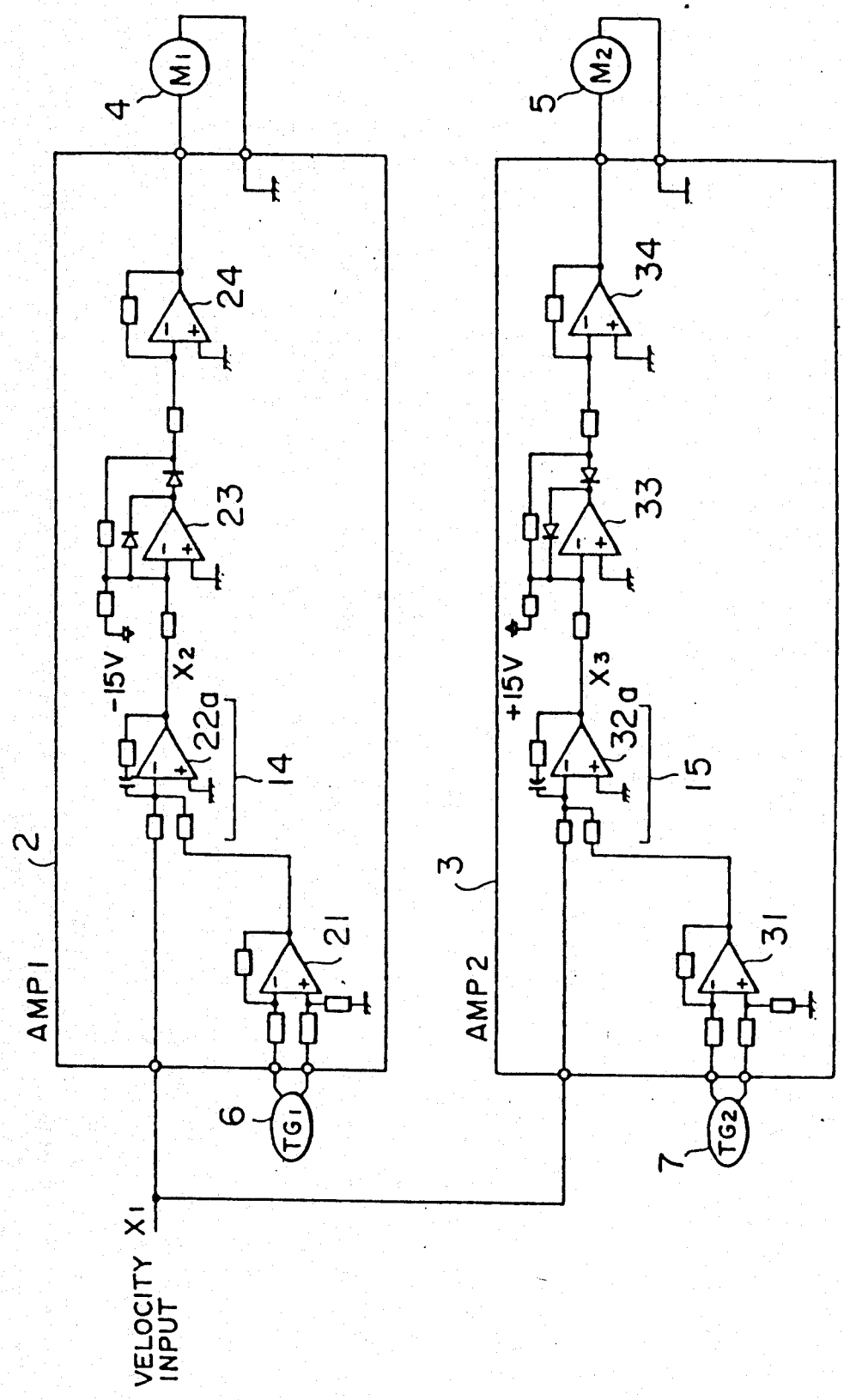
FIG. 8 is an arrangement diagram of the prior-art velocity amplifiers in which integral elements are incorporated.

Now, an embodiment of the present invention will be described with reference to the accompanying drawings. FIG. 2 shows the circuit of each of the integral elements 14 and 15 illustrated in FIG. 8. The input/output transfer function G$_1$(S) of this integral element is given by Eq. (1):

$$G_1(s) = -\left(\frac{R_2}{R_1} + \frac{1}{sCR_1}\right) \quad (1)$$

Figure 3:
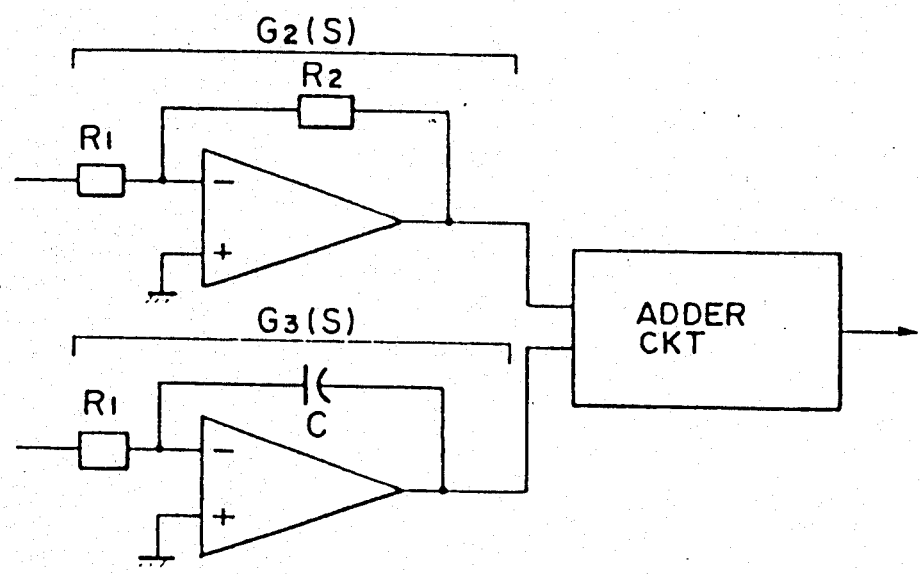
Figure 4:
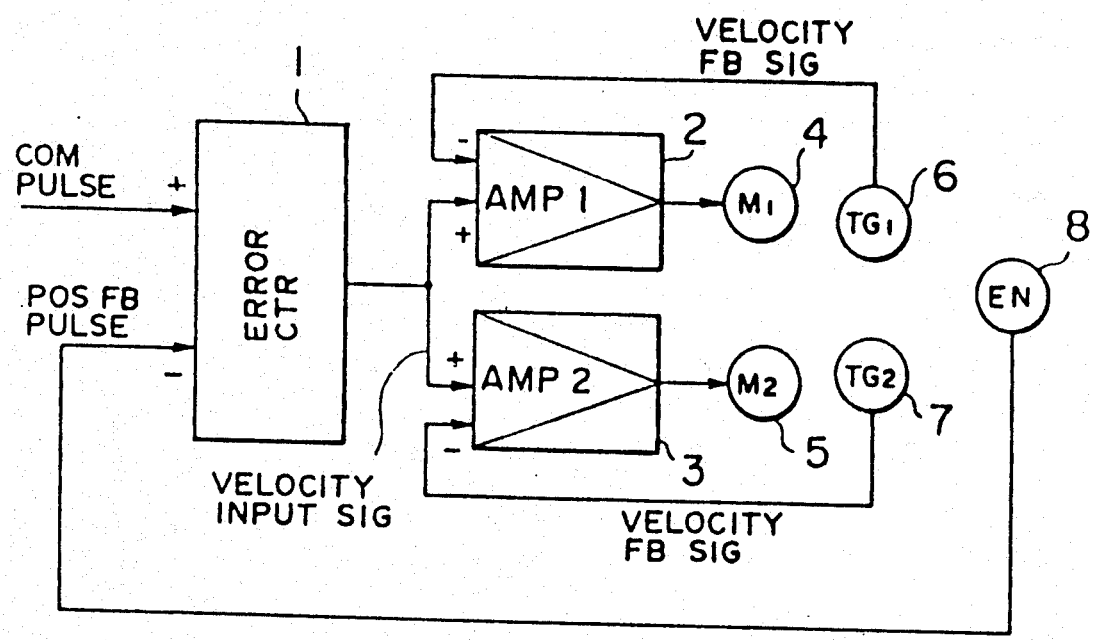
FIG. 4 is a prior art arrangement diagram of a servo driving device.
Figure 5:
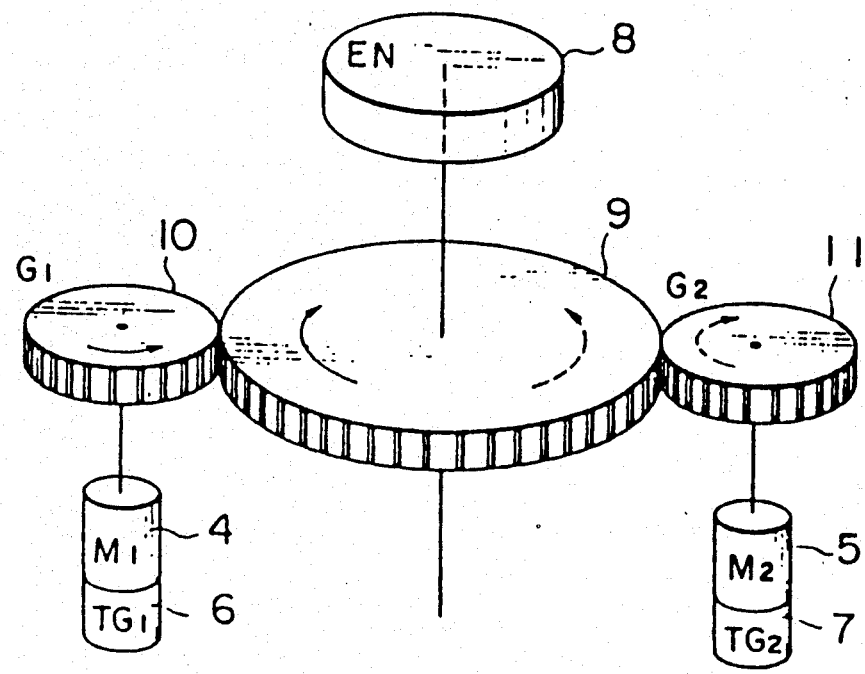
FIG. 5 is a diagram showing the mechanism portion of the servo system in the prior art FIG. 4.
Figure 6:
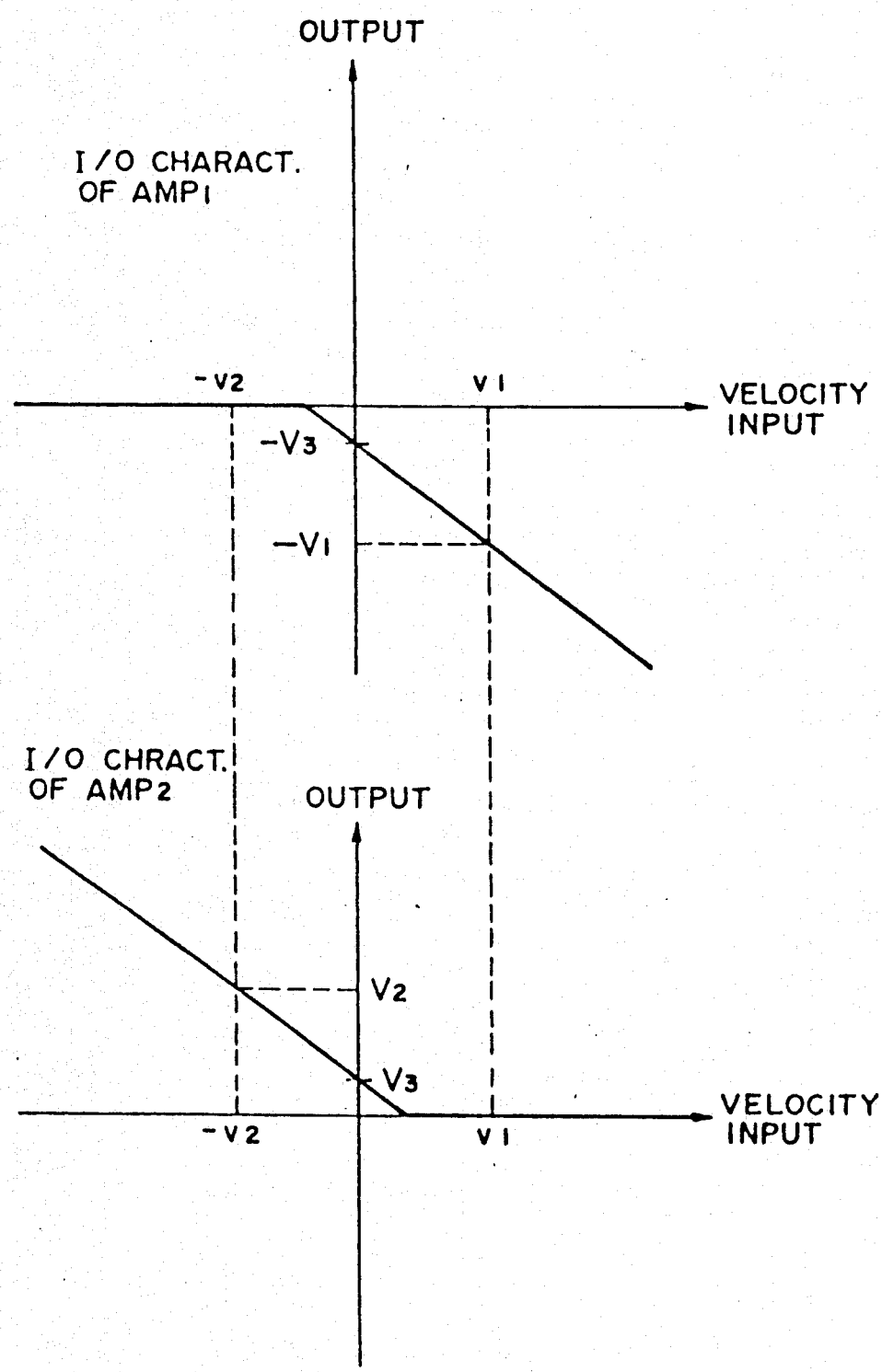
FIG. 6 is a graph of the input/output characteristics of velocity amplifiers in the prior art.
Figure 7:
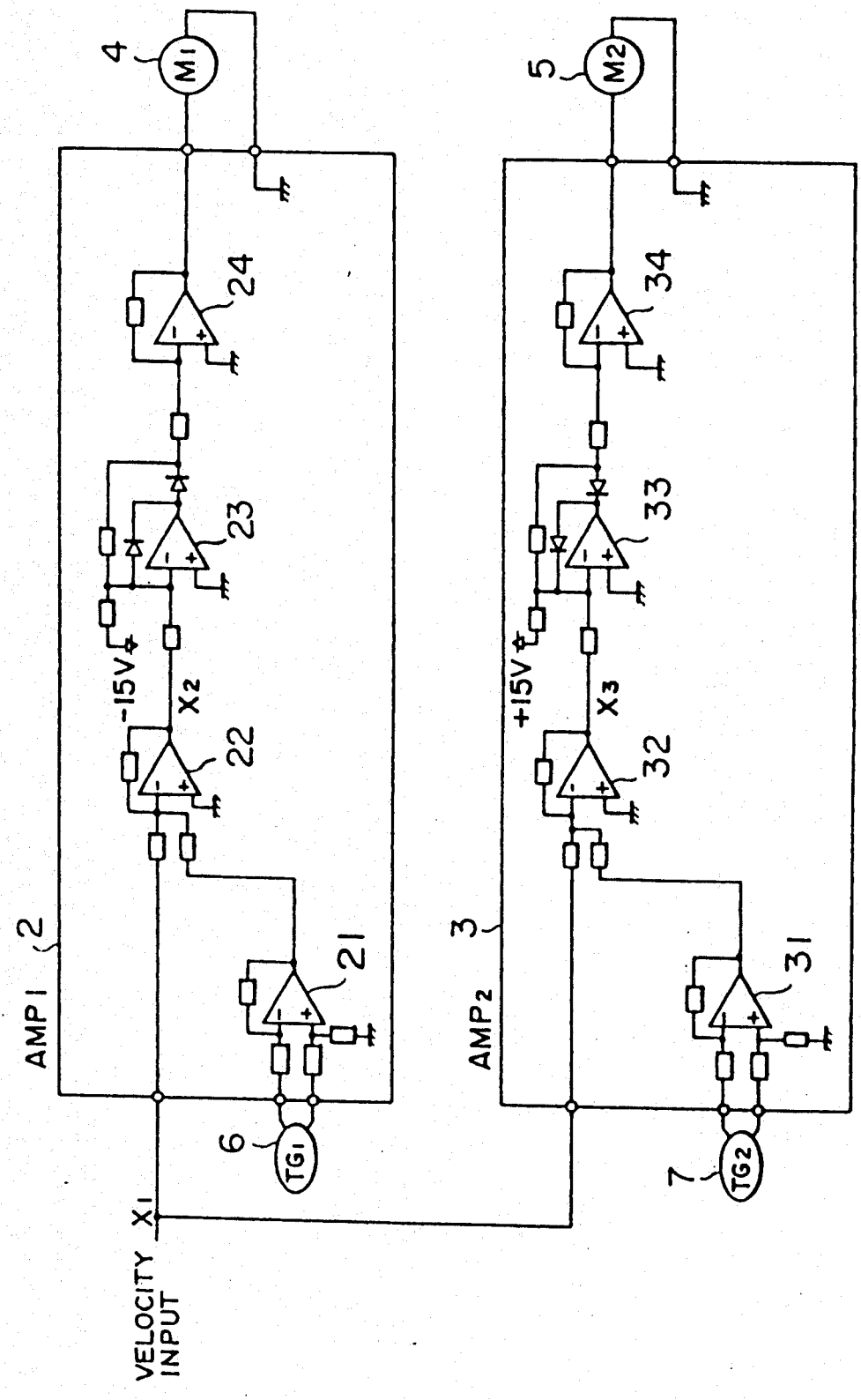
FIG. 7 is an arrangement diagram of velocity amplifiers in the prior art.

FIG. 3 shows an equivalent circuit of the circuit in FIG. 2. Transfer functions G$_2$(s) and G$_3$(s) indicated in FIG. 3 are respectively expressed by Eqs. (2) and (3):

$$G_2(s) = -\frac{R_2}{R_1} \quad (2)$$

$$G_3(s) = -\frac{1}{sCR_1} \quad (3)$$

Accordingly, a combined transfer function G$_4$(s) is obtained by adding the transfer functions G$_2$(s) and G$_3$(s) becomes:

$$G_4(s) = -\left(\frac{R_2}{R_1} + \frac{1}{sCR_1}\right)$$

which is the same as Eq. (1). It is therefore understood that the circuit in FIG. 3 is equivalent to the circuit in FIG. 2.

which is the same as Eq. (1). It is therefore understood that the circuit in FIG. 3 is equivalent to the circuit in FIG. 2.

Figure 1:
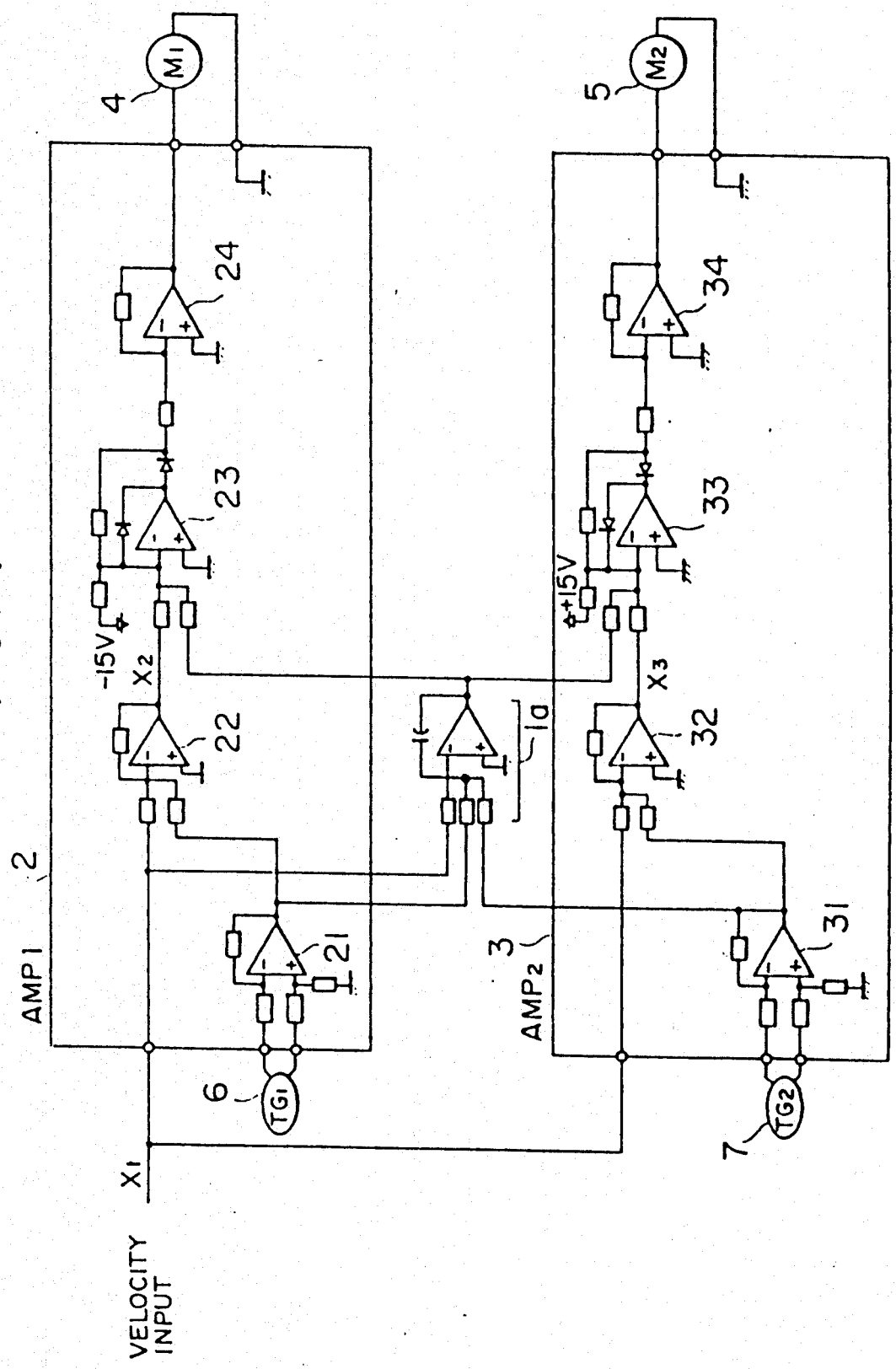
FIG. 1 is an arrangement diagram of velocity amplifiers in a motor driving device according to an embodiment of present invention.

FIG. 1 shows an embodiment in which a servo system is constructed with a single integral element 1a in relation to two motor controlling velocity amplifiers by utilizing the fact that, as clarified in FIG. 3, the integral element shown in FIG. 2 can be separated into a proportional term formed of resistors R$_1$ and R$_2$ and an integral term formed of the resistor R$_1$ and a capacitor C.

As the velocity feedback signals, the sum signal between the two signals of the velocity detectors $TG_1$ 6 and $TG_2$ 7 is used. In the case of the example shown in FIG. 8, it is indefinite whether or not the input voltages to the operational amplifiers 23 and 33, namely, the respective output voltages $X_2$ and $X_3$ of the two integral elements 14 and 15 become the same polarity in the mode of bringing the motors to a standstill. In contrast, in the case of FIG. 1, input voltages to the operational amplifiers 23 and 33 is the output voltage of the single integral element 1a and are therefore in the same polarity in the mode of bringing the motors to a standstill. In the embodiment shown in FIG. 1, accordingly, the motors $M_1$ 4 and $M_2$ 5 do not become stationary in the form of pulling each other in the state in which the armature currents in excess of the rated current value of the motors are flowing, in the aforementioned mode, so that the excess currents are prevented from continuing to flow through the motors.

In a case where the servo driving output stage is turned off (servo OFF), the motors are not driven by the driving device, and hence, the integral element is charged with an excess voltage. On this occasion, the moment the servo driving output stage is subsequently turned on (servo ON), the shafts of the motors move disadvantageously. It is therefore a matter of course that, in the servo OFF mode, the integral element is short-circuited by an analog switch or the like beforehand so as to be prevented from being charged with the excess voltage.

As described above, even for a positioning driving device with a construction wherein mechanical backlashes are eliminated using two motors, integral elements can be added without the drawback that excess currents flow through the motors. That is, a servo rigidity in a low-velocity region, especially the magnitude of a steady-state position error under a stationary condition can be made null in the state in which the stability of a servo system is secured, and the basic performance of the servo system can be greatly improved.

What is claimed is:

1. A motor driving device wherein two motors are held in engagement with an identical spindle through respective torque transmission mechanisms, and wherein each of the motors has a driving amplifier for generating a torque in a direction reverse to that of a torque of the other motor; comprising an integration circuit which integrates with respect to time a difference signal between an angel command value of said spindle and a rotational angle feedback value thereof, and which applies its integral output to the driving amplifiers in common, wherein the rotational angle feedback value of said spindle consists of a sum signal between velocity feedback signals of said two motors.

* * * * *